Nov. 16, 1954  W. DURA  2,694,221
MEAT TENDERIZER
Filed Sept. 11, 1952  2 Sheets-Sheet 1
Fig. 1.
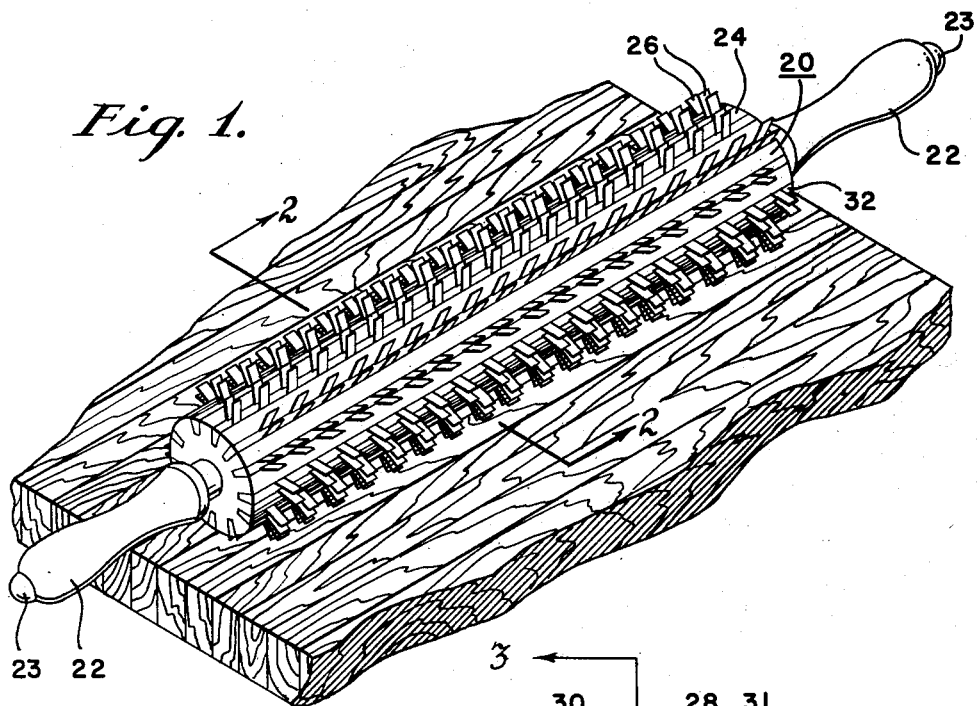
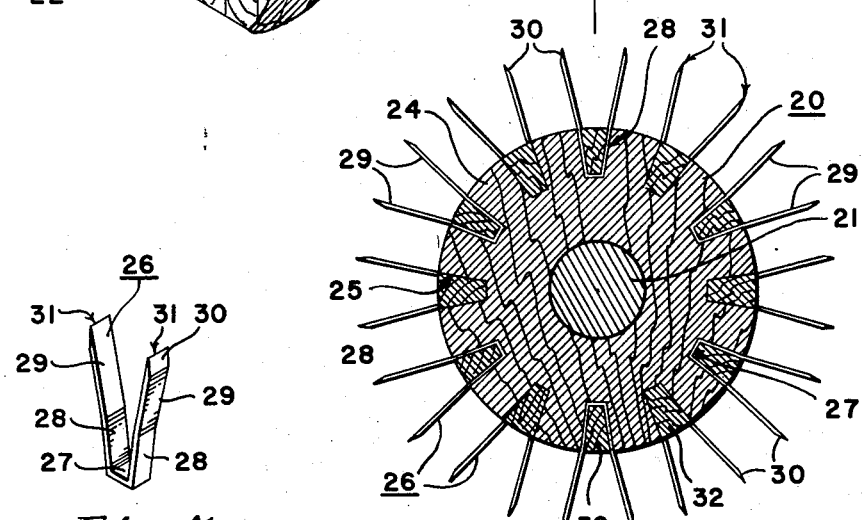
Fig. 5.  Fig. 2.
INVENTOR.
WALTER DURA
BY
ATTORNEY.

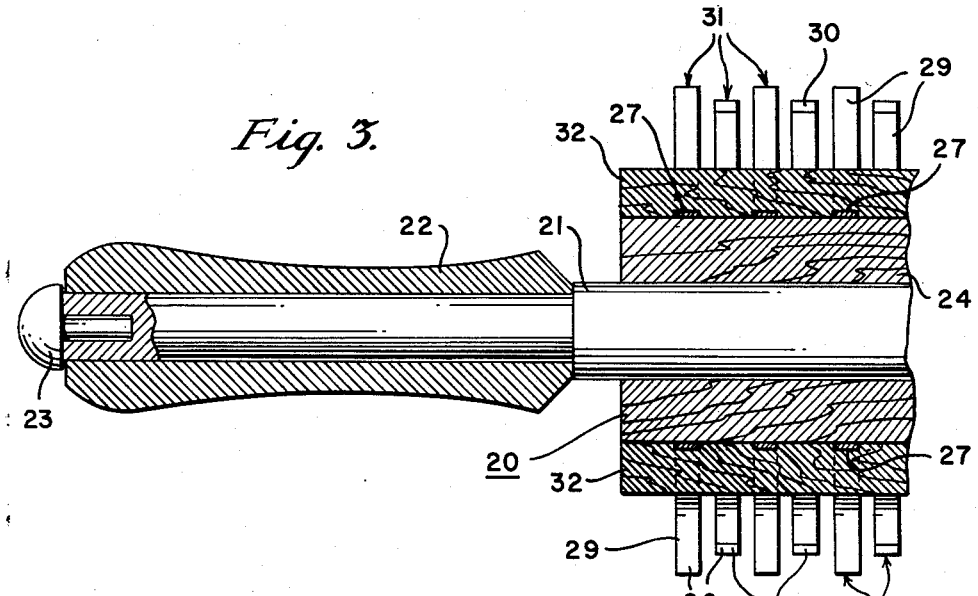
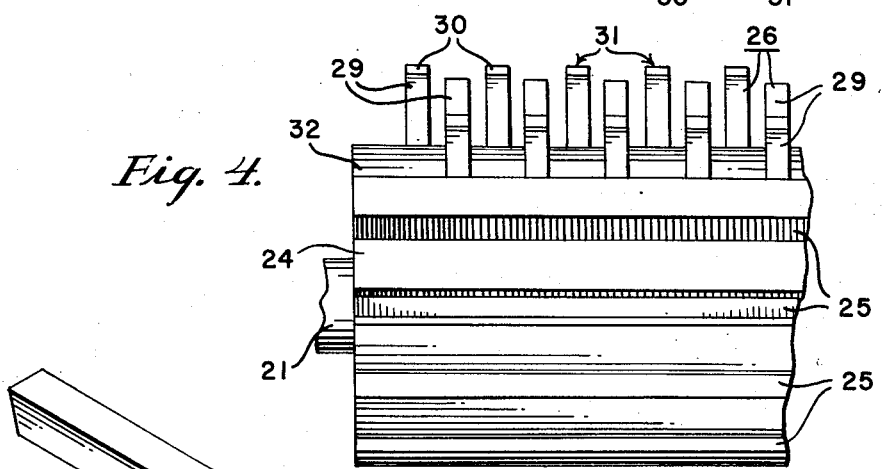
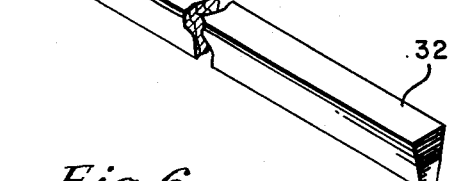
INVENTOR.
WALTER DURA

United States Patent Office 2,694,221
Patented Nov. 16, 1954

2,694,221

MEAT TENDERIZER

Walter Dura, Philadelphia, Pa.

Application September 11, 1952, Serial No. 309,066

1 Claim. (Cl. 17—29)

The present invention relates to kitchen utensils and particularly to devices for preparing food and still more particularly to a hand-operated instrument for tenderizing meat or the like.

An object of the present invention is to provide an easily-operated and easily-cleaned hand-operated meat tenderizer.

Another object of the present invention is to provide an inexpensive efficient portable meat tenderizer.

Further objects will be apparent by reference to the appended specification claim and drawings.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

In the drawings wherein like reference characters indicate like parts:

Figure 1 represents a perspective view of the meat tenderizer of the present invention.

Figure 2 represents a vertical cross-sectional view taken generally along line 2—2 of Figure 1.

Figure 3 represents a fragmentary vertical cross-sectional view taken generally along line 3—3 of Figure 2.

Figure 4 represents a fragmentary elevational view of the slotted drum-like roller of the utensil of the present invention, some of the slots having cutters and cutter-retaining strips therein while other slots are empty.

Figure 5 represents a perspective view of one of the cutters of the utensil of the present invention.

Figure 6 represents a perspective view of a cutter-retaining strip.

The kitchen utensil 20 of the present invention (which utensil may be used particularly for tenderizing meats, although it may have other uses, such as chopping meats etc.) includes an elongated shaft 21, at each end of which a handle 22 is rotatably journalled and held in place, as for example, by the retaining pin 23.

Rotatably mounted on the central portion of the shaft 21 is a drum-like roller 24 which has a plurality of axially-extending slots 25 around the periphery thereof; each slot having generally radially extending sides and being generally trapezoidal in cross-section.

The shaft 21, handles 22 and roller 24 may be made of any suitable material but preferably are made of wood.

Into each slot 25 a plurality of cutter-members 26 are placed, each cutter in any one slot being axially spaced from adjacent cutters and the cutters in adjacent rows being staggered or axially offset, as is shown particularly in Figure 4.

Each cutter 26 has a base portion 27 and lower side-portions 28; the base portion and side portions being shaped to fit closely within the slots 25. Each cutter has a pair of tines 29, the ends 30 of each tine being sharpened to a cutting edge 31.

A plurality of retaining strips 32, of the same length as the roller 24 and having substantially the same trapezoidal cross-sectional shape as the slots 25, are provided to retain the cutters 26 in each of the slots 25.

The cutters 26 are disposed within the slots 25, as shown in Figures 1 to 4, inclusive, with the base 27 at the bottom of the slot 25, and in appropriately spaced relationship to each other as is shown particularly in Figures 1, 3 and 4, whereupon the strip 32 is wedged into the slots above the base 27 and sides 28 of the cutters 26 whereby rigidly and firmly to hold the cutters 26 in place within the slots with the tines 29 extending generally radially outwardly around the periphery of the roller 24.

The wedge-shaped strips 32 may be retained in the slots 25 in any suitable manner as by gluing, nailing or the like or may be detached interlocked therein by any suitable locking arrangement, not shown so that the cutters 26 may be replaced if they become damaged or worn.

It is preferred that the roller 24 be of relatively harder wood than the strips 32 so that when the strips 32 are forced into the slots 25 to hold the cutters 26 in place the cutters will compress the adjacent material of the strip 32 and form a groove in the strip 32 which will prevent axial movement of the cutters in the slots 25. It is to be understood, however, that the slots 25 or the strips 32 or both may be pre-grooved (in a manner not shown) to receive the cutters in the grooves to prevent axial movement of the cutters in the slots.

The meat tenderizer of the present invention is operated somewhat in the manner of a rolling pin; being grasped by the handles 22 and rolled across the food placed upon a table top or like surface, with firm downward pressure of roller against food.

Because of the offset relationship of the teeth 26 in adjacent rows 25, the food is efficiently tenderized with a minimum of passes of the roller thereacross. Moreover, inasmuch as the cutters 26, in their preferred form are of tempered steel they will retain a sharp edge 31.

The present invention may be embodied in other specific forms without departing from the spirit or essential attributes thereof, and it is therefore desired that the present embodiment be considered in all respects as illustrative and not restrictive, reference being had to the appended claim rather than to the foregoing description to indicate the scope of the invention.

Having described my invention what I claim as new and desire to protect by Letters Patent is the following:

A hand-operated meat tenderizer including a generally cylindrical drum fabricated of relatively hard wood rotatably mounted upon a shaft having ends extending axially beyond the ends of said drum, a plurality of circumferentially-spaced trapezoidally-shaped slots in the surface of said drum, a plurality of generally U-shaped cutters disposed in each of said slots in axially-spaced relation to each other, the ends of said cutters extending radially beyond the surface of said drum, cutters in circumferentially adjacent rows being axially spaced from adjacent cutters, trapezoidally-shaped cutter-retaining strips fabricated of relatively soft wood disposed in said slots, and handles adapted to be manually held by the user rotatably mounted on each end of said shaft.

References Cited in the file of this patent

UNITED STATES PATENTS

| Number | Name | Date |
|---|---|---|
| 150,893 | Robbins et al. | May 12, 1874 |
| 448,482 | Ginter | Mar. 17, 1891 |
| 725,840 | Hastings | Apr. 21, 1903 |
| 1,465,075 | Di Carlo | Aug. 14, 1923 |
| 1,615,134 | Price | Jan. 18, 1927 |
| 2,546,577 | Young | Mar. 27, 1951 |